United States Patent [19]
Phillips

[11] 4,327,668
[45] May 4, 1982

[54] RECREATIONAL DEVICE

[76] Inventor: Robert G. Phillips, 2710 Blueridge Ave., Wheaton, Md. 20902

[21] Appl. No.: 225,354

[22] Filed: Jan. 15, 1981

[51] Int. Cl.³ ............................................. A01K 29/00
[52] U.S. Cl. ..................................................... 119/29
[58] Field of Search ............... 46/13; 119/29; D30/99

[56] References Cited

U.S. PATENT DOCUMENTS

| | | | |
|---|---|---|---|
| 1,224,430 | 6/1917 | Thurman | 46/123 |
| 2,175,604 | 10/1939 | Holmes | 43/13 |
| 2,246,965 | 6/1941 | Yoder | 119/29 |
| 2,540,309 | 2/1951 | Winsor | 119/29 |
| 2,620,591 | 12/1952 | Scola | 46/13 |
| 2,725,670 | 12/1955 | Hodes | 46/116 |
| 2,846,222 | 8/1958 | Handler | 46/13 X |
| 3,159,141 | 12/1964 | Paterek | 119/29 |
| 4,112,873 | 9/1978 | Van Zandt | 119/29 |
| 4,177,761 | 2/1979 | Bellocchi, Jr. | 119/19 |

Primary Examiner—Hugh R. Chamblee
Attorney, Agent, or Firm—Raphael Semmes

[57] ABSTRACT

An amusement device includes a number of model mice each mounted on a baseboard for movement into and out of respective enclosures on the board. A user can operate the models from beneath the board to move them back and forth into and out of the enclosures. The device is intended to provide recreational activity for a pet owner and pet while protecting the owner's hands against inadvertent scratching or biting.

9 Claims, 4 Drawing Figures

RECREATIONAL DEVICE

BACKGROUND OF THE INVENTION

The invention relates to a device for providing co-participatory recreational activity for a pet owner and his or her pet.

It is an object of the invention to provide a device as specified which is adapted to provide amusement and/or exercise for a pet and simultaneous amusement for the pet owner.

A further object of the invention is to provide a device enabling a pet owner to play with his or her pet while the owner's hands are protected from being inadvertently clawed, scratched or bitten.

SUMMARY OF THE INVENTION

The invention provides, at least in its broadest aspect, a recreational device for the purpose specified in the form of a baseboard having at least one enclosure on its upper surface, a model simulating a living creature, such as a mouse, mounted on the upper surface of the baseboard for movement into and out of the enclosure, and operating means for moving the model into and out of the enclosure.

Preferably, the operating means may be positioned for manual operation from beneath the baseboard, and the baseboard may be provided with means for supporting it on a working surface (e.g., a floor or earth surface) such that the operating means is accessible to a user while the upper surface of the baseboard is accessible to a pet from the working surface.

With the above arrangement, the model can be operated to move into and out of the enclosure to tempt the pet into play while the user's hands are protected beneath the baseboard to avoid them being accidentally bitten or scratched should the pet become over-exuberant.

Additional features of the invention will be apparent from the ensuing description and claims taken in conjunction with the attached drawings.

DESCRIPTION OF THE PREFERRED EMBODIMENT

Figure 1:
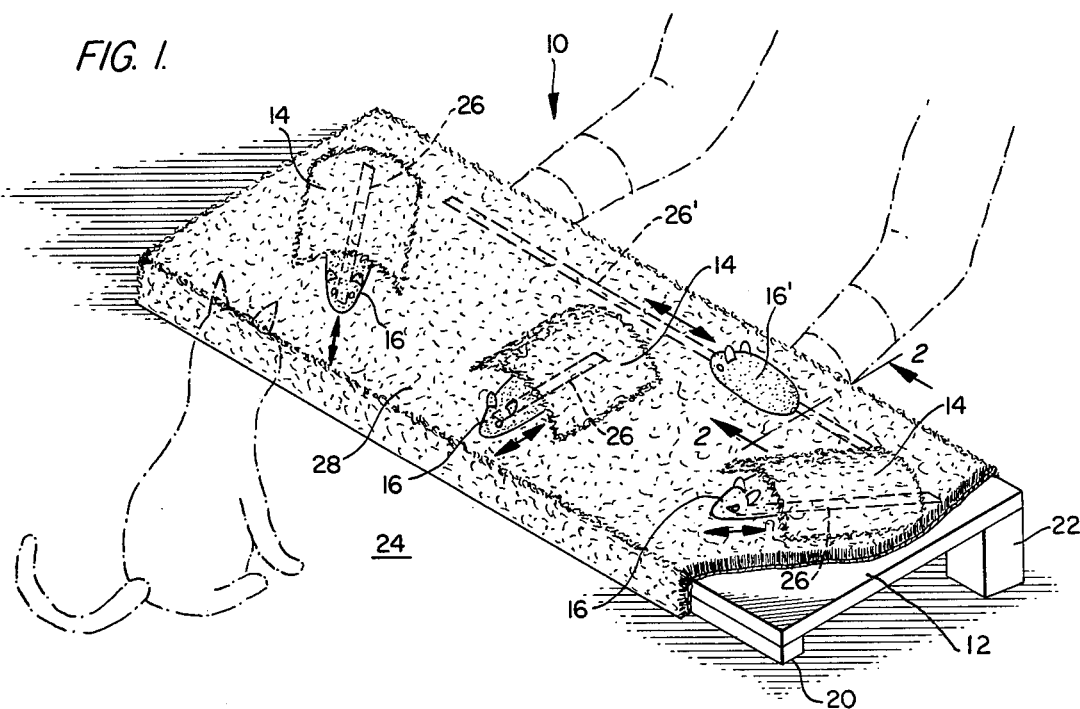
FIG. 1 is a perspective view of a recreational device in accordance with the invention.
Figure 2:
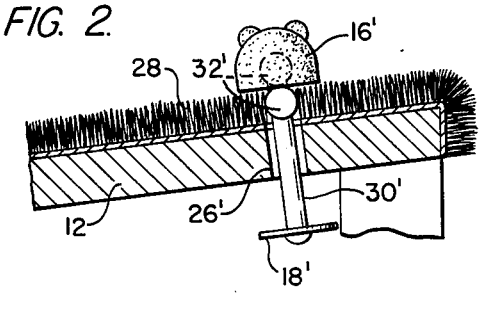
FIG. 2 is a sectional view on line 2—2 of FIG. 1.
Figure 3:
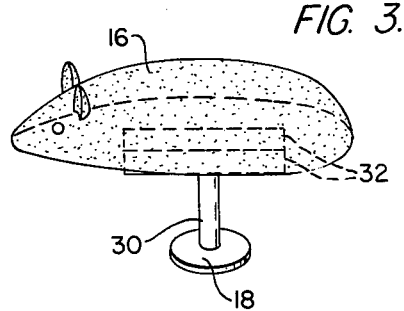
FIG. 3 is a perspective view of a model simulating a mouse as used in the device.
Figure 4:
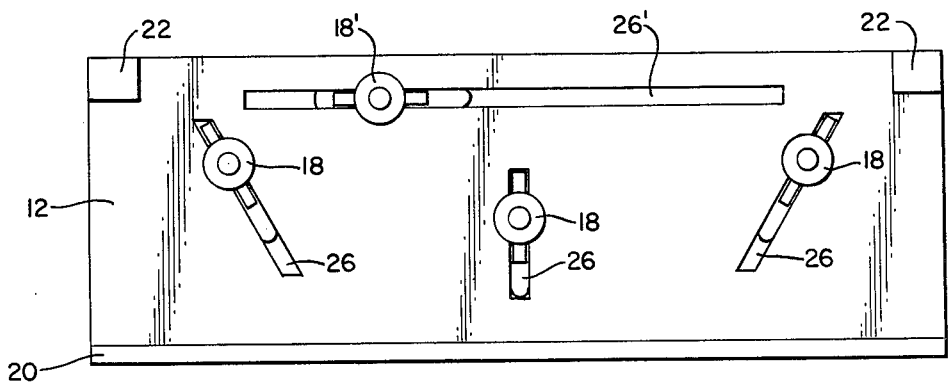
FIG. 4 is an underneath plan view of the device.

The illustrated recreational device 10 includes a baseboard 12 on the upper surface of which are situated a plurality of tunnel-like enclosures 14 (three in the embodiment shown) and models 16 simulating mice, each mounted for movement into and out of one of the enclosures. Each model is provided with operating means 18, as will be described, accessible to a user from underneath baseboard 12 for manually moving the models into and out of the respective enclosures.

Baseboard 12 may, for example, comprise a particleboard or the like, suitable dimensions for which may be $\frac{5}{8}$" thick, $28\frac{1}{2}$" long and 10" wide. Along the front edge of the board a supporting strip 20, conveniently a wooden strip $\frac{3}{4}$" thick and $1\frac{1}{2}$" high, may be attached by any convenient fastening means and the rear corners of the board are provided with support legs 22, conveniently $1\frac{1}{2}$"×$1\frac{1}{2}$" wooden studs about $2\frac{1}{2}$" in height. Thus, baseboard 12 can be supported at an incline on a working surface 24 (FIG. 1) with the underneath of the board being accessible from the rear to a user, and the upper surface of the board being accessible to a pet from the working surface.

The enclosures 14 may be formed by sheets of flexible material such as hard rubber curved to shape, and the edges of which are secured to the upper surface of the baseboard by adhesive or other suitable fastening means. Each sheet may have a length (the tunnel length) of about 5" and a width of about $6\frac{1}{2}$".

Under the enclosures, baseboard 12 is formed with elongate slots 26, each extending substantially the full length of the enclosure and projecting about 1" from the forward ends of the respective enclosures.

The entire upper surface of baseboard 12 and also the exposed surfaces of the enclosures may be covered with plush washable carpeting 28. The carpeting should have slits conforming to slots 26 in board 12.

The models 16 may be made of cloth stuffed with a suitable filling such as cotton and catnip and each may be provided with a semi-rigid base. Projecting from the base of each model is a dowel post 30 forming connecting means between the model and its operating means 18, the post being connected to the model by transverse dowels 32 embracing the model base. The operating means 18 may in each case comprise a disc attached to the lower end of post 30.

The device is assembled with the posts 30 extending through the respective slots 26 so that the models can be moved back and forth along the slots as guides, into and out of openings in the respective enclosures by manually moving the operating discs from underneath the baseboard. The slots and transverse dowels may have approximately the same width, conveniently $\frac{1}{2}$", and posts 30 may for example be $\frac{1}{4}$" dowelling. The pile of carpeting 28 does not interfere with the sliding movement of the models in the slots.

Models 16, enclosures 14, and slots 26 may be dimensioned so that the models can be completely concealed in the respective enclosures and emerge partly or fully therefrom. In the illustrated embodiment, the device includes an optional additional slot 26' and associated model 16', post 30', dowels 32', and operating means 18', with no associated enclosure in this case.

In use, back and forth movement of the models in the slots can be used to attract the interest of the pet, such as a cat, tempting the pet to play with the models. The operator's hands are protected beneath the baseboard against inadvertent scratches or bites should the pet become over-exuberant in its play.

The carpeting, the texture of which is appealing particularly to cats, may be colored to contrast with highly colored models so that the models stand out to the pet in appearance.

While only a preferred embodiment of the invention has been described in detail, the invention is not limited thereby and modifications can be made within the scope of the attached claims. For example, the models could be remotely operated such as by attaching rods or the like to the post 30. Also, models simulating creatures other than mice can be used.

I claim:

1. A recreational device for providing co-participatory activity for a pet owner and a pet comprising a baseboard, an enclosure situated on an upper surface of the baseboard, a model simulating a living creature, means mounting said model on the upper surface of the baseboard for reciprocating movement into and out of said enclosure through an opening in the enclosure, and manual operating means for moving said model manually back and forth through said opening into and out of said enclosure to tempt the pet to play with the model, wherein the operating means is adapted to be operated with a pet owner's hand situated beneath the board for protection and the device includes means for supporting the board on a working surface on an incline with the operating means being accessible beneath the board to the pet owner and the upper surface of the board being accessible to a pet from the working surface.

2. A device as claimed in claim 1, wherein the upper surface of the board and the outer surface of said enclosure are both carpeted.

3. A device as claimed in claim 1, wherein said enclosure is a tunnel concealing said model when the model is moved into the enclosure.

4. A device as claimed in claim 1, wherein the model simulates a mouse.

5. A device as claimed in claim 1, wherein said board includes an elongate slot for guiding movement of the model from a position at least partially within said enclosure to a position outwardly of said enclosure, and said mounting means for said model includes a connector means attached to the model and extending through said slot.

6. A device as defined in claim 5, wherein said connector means is attached beneath the board to said manual operating means.

7. A device as claimed in claim 5, wherein said slot is substantially linear.

8. A device as defined in claim 1, wherein the enclosure, the model, and the model mounting means are replicated at different locations on the board.

9. A device as defined in claim 8, including separate manual operating means for each model.

* * * * *